US011695642B2

(12) United States Patent
Bhat et al.

(10) Patent No.: US 11,695,642 B2
(45) Date of Patent: *Jul. 4, 2023

(54) VIRTUALIZED NETWORK SERVICE MANAGEMENT AND DIAGNOSTICS

(71) Applicant: Verizon Patent and Licensing Inc., Basking Ridge, NJ (US)

(72) Inventors: Krishna Prakash Bhat, Richardson, TX (US); Raju Sharma, Raleigh, NC (US); Manish Srivastava, Frisco, TX (US); Ramesh Nadella, Allen, TX (US); Kumara B. Tamada, Apex, NC (US); Sivanaga Ravi Kumar Chunduru Venkata, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/248,345

(22) Filed: Jan. 21, 2021

(65) Prior Publication Data

US 2021/0144065 A1  May 13, 2021

Related U.S. Application Data

(63) Continuation of application No. 16/227,511, filed on Dec. 20, 2018, now Pat. No. 10,917,308.

(51) Int. Cl.
*H04L 41/14* (2022.01)
*H04L 12/28* (2006.01)
(Continued)

(52) U.S. Cl.
CPC .......... *H04L 41/14* (2013.01); *H04L 12/2854* (2013.01); *H04L 41/0645* (2013.01);
(Continued)

(58) Field of Classification Search
CPC ......... H04L 41/08; H04L 41/14; H04L 41/22; H04L 41/40; H04L 41/064; H04L 41/147;
(Continued)

(56) References Cited

U.S. PATENT DOCUMENTS 9,882,789 B2    1/2018  Qian et al.
2006/0064282 A1* 3/2006  Marilly ................. H04L 41/16
                                                        702/183
(Continued)

*Primary Examiner* — James N Fiorillo

(57) ABSTRACT

A device monitors, for a software-defined networking wide area network (SD-WAN) deployment, a set of virtualized network services of the SD-WAN deployment, and applies a set of diagnostic tests to evaluate the set of virtualized network services. The device detects, based on monitoring the set of virtualized network services and in connection with applying the set of diagnostic tests, an event associated with a virtualized network service. The device analyzes, using an analytics model of SD-WAN operation, the event to identify an issue associated with the virtualized network service, and determines, based on the analytics model of SD-WAN operation, a recommendation relating to remediating the issue. The device generates an abstraction layer user interface to represent the set of virtualized network services and to convey the recommendation relating to remediating the issue, and implements, after providing the abstraction layer user interface, the recommendation to remediate the issue.

20 Claims, 8 Drawing Sheets

(51) Int. Cl.
  *H04L 41/0631* (2022.01)
  *H04L 41/5025* (2022.01)
  *H04L 41/5051* (2022.01)
  *H04L 41/0823* (2022.01)
  *H04L 41/0677* (2022.01)

(52) U.S. Cl.
  CPC ...... *H04L 41/0677* (2013.01); *H04L 41/0823* (2013.01); *H04L 41/5025* (2013.01); *H04L 41/5051* (2013.01)

(58) Field of Classification Search
  CPC .............. H04L 41/149; H04L 41/0631; H04L 41/0645; H04L 41/0659; H04L 41/0671; H04L 41/0677; H04L 41/0823; H04L 41/0866; H04L 41/0883; H04L 41/0895; H04L 41/5025; H04L 41/5051; H04L 12/28; H04L 12/2854; H04L 43/08; H04L 43/16; H04L 43/20; H04L 43/55; H04L 43/0817; H04L 45/38; H04W 24/02
  USPC ........................................................ 709/224
  See application file for complete search history.

(56) References Cited

U.S. PATENT DOCUMENTS

| | | | |
|---|---|---|---|
| 2014/0129700 A1 | 5/2014 | Mehta et al. | |
| 2014/0298091 A1 | 10/2014 | Carlen et al. | |
| 2014/0310222 A1* | 10/2014 | Davlos | G06F 11/2294 706/46 |
| 2015/0244617 A1 | 8/2015 | Nakil et al. | |
| 2015/0365288 A1* | 12/2015 | Van Der Merwe | H04L 41/16 370/254 |
| 2016/0127201 A1 | 5/2016 | Qian et al. | |
| 2016/0140515 A1 | 5/2016 | Katsumata et al. | |
| 2016/0149790 A1* | 5/2016 | Zimmermann | G06F 9/45558 709/224 |
| 2017/0034023 A1 | 2/2017 | Nickolov et al. | |
| 2017/0149637 A1* | 5/2017 | Banikazemi | H04L 43/16 |
| 2017/0171049 A1 | 6/2017 | Kriegesmann et al. | |
| 2018/0024537 A1 | 1/2018 | Chauvet et al. | |
| 2018/0077080 A1* | 3/2018 | Gazier | H04L 41/0897 |
| 2018/0101397 A1 | 4/2018 | Sergeev | |
| 2018/0139677 A1* | 5/2018 | Malatack | H04L 41/5051 |
| 2018/0234288 A1* | 8/2018 | Soderlund | H04L 41/064 |
| 2018/0316594 A1 | 11/2018 | Wu et al. | |
| 2018/0351788 A1 | 12/2018 | Tammana et al. | |
| 2018/0351806 A1 | 12/2018 | Mohanram et al. | |
| 2018/0359159 A1 | 12/2018 | Calo et al. | |
| 2019/0036869 A1 | 1/2019 | Jana | |
| 2019/0058656 A1 | 2/2019 | Gundersen et al. | |
| 2019/0068619 A1 | 2/2019 | Fan et al. | |
| 2019/0104022 A1 | 4/2019 | Power et al. | |
| 2019/0140976 A1 | 5/2019 | Liou et al. | |
| 2019/0207772 A1* | 7/2019 | Hecht | H04L 63/10 |
| 2019/0238450 A1* | 8/2019 | Michael | H04L 45/123 |
| 2019/0260754 A1* | 8/2019 | Hecht | H04L 63/08 |
| 2019/0280942 A1* | 9/2019 | Côté | H04W 24/08 |
| 2019/0334910 A1 | 10/2019 | Parthasarathy et al. | |
| 2019/0349275 A1 | 11/2019 | Chen et al. | |
| 2020/0067772 A1 | 2/2020 | Tomkins et al. | |
| 2020/0067776 A1 | 2/2020 | Williams et al. | |
| 2020/0067794 A1 | 2/2020 | Calo et al. | |
| 2020/0159380 A1* | 5/2020 | Wadikar | G06F 3/04842 |
| 2020/0162343 A1* | 5/2020 | Salam | H04L 41/40 |
| 2020/0162589 A1* | 5/2020 | Vijayadharan | H04L 41/22 |
| 2020/0169473 A1 | 5/2020 | Rimar et al. | |
| 2022/0217557 A1* | 7/2022 | Piriou | H04W 24/08 |

* cited by examiner

100 ⟶

| 170: User Interface – Summary Page | |
|---|---|
| 172: Current Network Deployment<br>-Branch Office Network<br>-Orchestration Cloud Network<br>-Headquarters Office Network | 176: Chat Management Console:<br><br>Bot: I have detected two issues?<br>You: What are the issues?<br>Bot: The first issue relates to uCPE connectivity at the Branch Office Location. The second issue relates to a series of trouble tickets indicating slow connectivity at the Headquarters Office.<br>You: Are there any recommendations for resolving these issues?<br>Bot: Yes. I recommend restarting the uCPE and increasing a bandwidth allocation to resolve the issues. I can do both, automatically, if you would like.<br>You: Yes, please.<br>Bot: You're welcome, it is done. I will continue monitoring and alert you if these recommendations were successful.<br>...<br>...<br>Bot: Alert! As an update, I no longer detect the two issues. |
| 174: Test Results<br><br>Test 1 Results (Hardware) - Pass<br><br>Test 2 Results (Connectivity) - Fail<br><br>Test 3 Results (VNS) - Pass | |

FIG. 1E

VIRTUALIZED NETWORK SERVICE MANAGEMENT AND DIAGNOSTICS

RELATED APPLICATION

This application is a continuation of U.S. patent application Ser. No. 16/227,511, entitled "VIRTUALIZED NETWORK SERVICE MANAGEMENT AND DIAGNOSTICS," filed Dec. 20, 2018 (now U.S. Pat. No. 10,917,308), which is incorporated herein by reference.

BACKGROUND

Network function virtualization can be used to virtualize network services to improve network flexibility, reduce costs associated with establishing new network deployments, and/or the like. For example, cloud computing resources can be used to replace physical purpose built load balancers, firewalls, intrusion detection devices, and/or the like with virtualized load balancers, virtualized firewalls, virtualized intrusion detection devices, and/or the like. A software-defined networking wide area network (SD-WAN) can be deployed in connection with virtualized network services to decouple network hardware (e.g., which can be implemented using dedicated hardware and/or allocated cloud resources) from control systems for the network hardware. In this way, networking deployments can be established to enable organizations to communicate data between different physical locations using, for example, the Internet rather than using expensive private wide area networks (WANs) using, for example multiprotocol layer switching (MPLS) techniques.

BRIEF DESCRIPTION OF THE DRAWINGS

FIGS. 1A-1E are diagrams of an example implementation described herein.

DETAILED DESCRIPTION OF PREFERRED EMBODIMENTS

The following detailed description of example implementations refers to the accompanying drawings. The same reference numbers in different drawings can identify the same or similar elements.

An SD-WAN deployment can be used to provide a combination of physical network services and virtualized network services. In enterprise scenarios, an organization can have multiple physical locations (e.g., a headquarters location, a branch location, a data center location, and/or the like) that can be connected using network services deployed in an SD-WAN configuration. Each network service (i.e., physical network service or virtualized network service) can be associated with a different vendor and a vendor-specific management portal. For example, a single organization can use a first management portal for managing a first virtualized network service associated with a first vendor, and a second management portal for managing a second virtualized network service associated with a second vendor. When an organization switches service providers for a virtualized network service in an SD-WAN deployment, the organization can need to retrain employees, download new management software, redesign proprietary tools, and/or the like. This can be time consuming, expensive, and resource intensive (e.g., using excessive network resources, computing resources, and/or the like).

Some implementations described herein provide a service management platform to perform end-to-end diagnostic testing and remediation of errors for multiple different virtualized network services, to provide an abstraction layer user interface for managing the multiple different virtualized network services, and/or the like. In this case, the service management platform can decouple management of an SD-WAN deployment from specific vendors providing specific virtualized network services of the SD-WAN deployment. In this way, the service management platform can reduce a utilization of computing resources to train and/or retrain employees, to download multiple different management portals, and/or the like. Further, by providing automatic diagnostic testing and remediation, the service management platform reduces a computing resource utilization relating to attempting to use malfunctioning virtualized network services by reducing an amount of time that virtualized network services remain malfunctioning relative to human-based intervention.

Figure 1A:
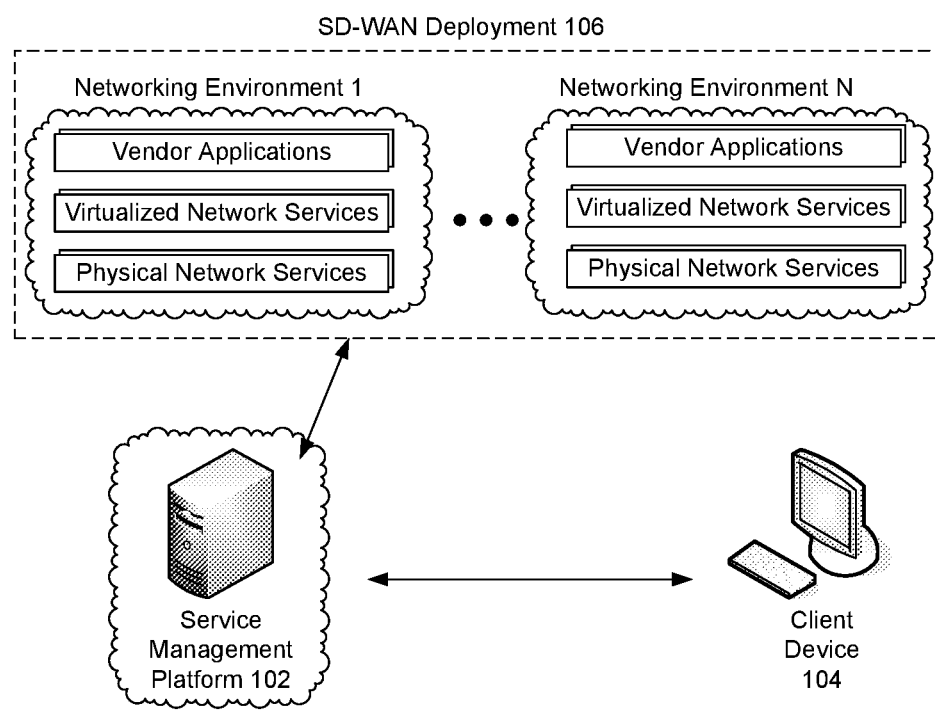

FIGS. 1A-1E are diagrams of an example implementation 100 described herein. As shown in FIG. 1A, example implementation 100 can include a service management platform 102, a client device 104, and an SD-WAN deployment 106. In some implementations, service management platform 102 can be implemented in a cloud computing environment to manage virtualized network services of SD-WAN deployment 106. For example, service management platform 102 can act as an orchestration device that performs end-to-end diagnostic testing and remediation of issues for multiple different virtualized network services. Additionally, or alternatively, service management platform 102 can be implemented outside of a cloud computing environment.

As further shown in FIG. 1A, SD-WAN deployment 106 can include one or more networking environments. For example, SD-WAN deployment 106 can include a first networking environment associated with a first physical location of an organization (e.g., a headquarters), a second networking environment associated with a second physical location of an organization (e.g., a branch office), and/or the like. Additionally, or alternatively, SD-WAN deployment 106 can include multiple networking environments at a common location. In some implementations, each networking environment of SD-WAN deployment 106 can include network resources (e.g., hardware resources, cloud resources, and/or the like). For example, a networking environment can include one or more vendor applications, one or more virtualized network services, one or more physical network services, and/or the like deployed to enable operations at one or more locations connected using the multiple networking environments and supported by multiple vendors.

Figure 1B:
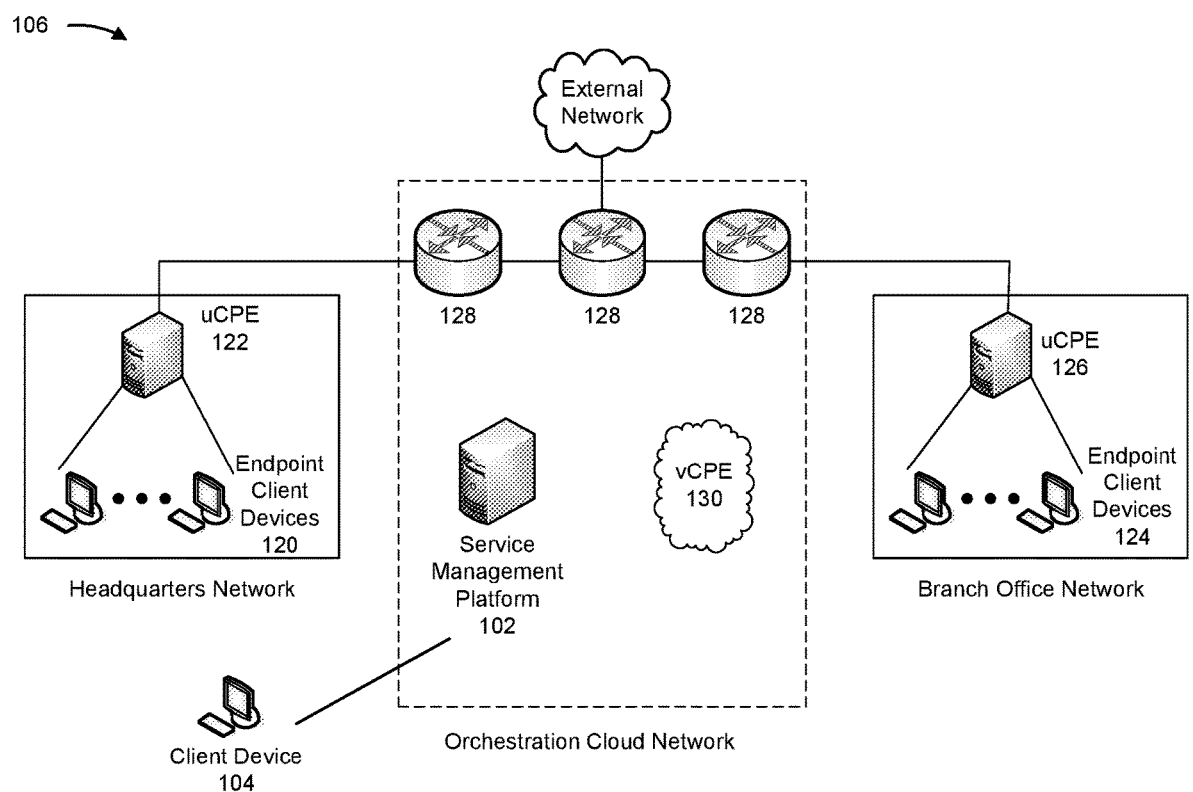

As shown in FIG. 1B, an example SD-WAN deployment 106 can include a headquarters network, an orchestration cloud network, and a branch office network. Although some implementations are described herein in terms of three networks in SD-WAN deployment 106, other SD-WAN deployments are possible.

As further shown in FIG. 1B, the headquarters network can include a set of end-point client devices 120. Each end-point client device 120 can connect to a universal customer premises equipment (uCPE) 122, which can provide external connectivity, such as to the orchestration cloud network, to the branch office network (e.g., via the orchestration cloud network), to an external network (e.g., the Internet via the orchestration cloud network), and/or the like.

As shown in FIG. 1B, the branch office network can include a set of end-point client devices 124. Each end-point client device 124 can connect to a universal customer premises equipment (uCPE) 126, which can provide external connectivity, such as to the orchestration cloud network, to the headquarters network (e.g., via the orchestration cloud network), to an external network (e.g., the Internet via the orchestration cloud network), and/or the like. In some implementations, end-point client devices 120 and 124 can be user devices (e.g., laptop computers, desktop computers, mobile phones, etc.) that can provide access to information in an enterprise network. In some implementations, uCPEs 122 and 126 can each be servers providing a virtualized network function (VNF) for the SD-WAN deployment.

As further shown in FIG. 1B, the orchestration cloud network can include a set of gateway devices 128, a service management platform 102, a virtual customer premises equipment (vCPE) 130, and/or the like. For example, the orchestration cloud network can include a first gateway device 128 that is an edge device or router for providing access between uCPE 122 and the orchestration cloud network. Additionally, or alternatively, the orchestration cloud network can include a second gateway device 128 that is an edge device or router for providing access between uCPE 126 and the orchestration cloud network. Additionally, or alternatively, the orchestration cloud network can include a third gateway device 128 that is an edge device or router for providing access between the orchestration cloud network and an external network, such as the Internet, another enterprise network, and/or the like. In some implementations, the orchestration cloud network can be a cloud computing environment that provides computing resources to instantiate gateway devices 128, service management platform 102, and/or the like. In some implementations, vCPE 130 can provide access to a virtual private cloud within the orchestration cloud network, thereby providing an on-demand configurable pool of shared computing resources for an organization within a public cloud for multiple organizations.

In some implementations, SD-WAN deployment 106 can enable service management platform 102 to perform failure detection. For example, service management platform 102 can monitor uCPEs 122 and 126 (and multiple virtualized network functions thereof), gateway devices 128, vCPE 130, service management platform 102 (e.g., using a self-monitoring functionality), and/or the like to detect an issue, such as a connectivity failure. In this way, using virtualized network services for SD-WAN deployment 106 provides improved granularity of monitoring relative to hardware based network deployments (e.g., customer edge routers and provider edge routers, where a monitoring device can be limited to queries of external physical devices to determine route reachability and link status). For example, service management platform 102 can monitor the multiple virtualized network functions, a software defined networking overlay of SD-WAN deployment 106, a service chain deployment (e.g., a set of virtualized network services forming a service chain, such as a firewall, a load balancer, an intrusion detection device, etc.) in SD-WAN deployment 106, and/or the like regardless of vendor, hardware type, and/or the like.

In some implementations, based on using virtualized network services with service management platform 102, SD-WAN deployment 106 can be implemented using commercial off-the-shelf (COTS) technology, thereby increasing deployment flexibility by enabling white-box usage rather than dedicated hardware. In some implementations, SD-WAN deployment 106 can include an OpenStack deployment with a set of application programming interfaces, can include a set of global application specific policies to provide granular control of functionality of the SD-WAN deployment, and can maintain one or more service level agreements.

Figure 1C:
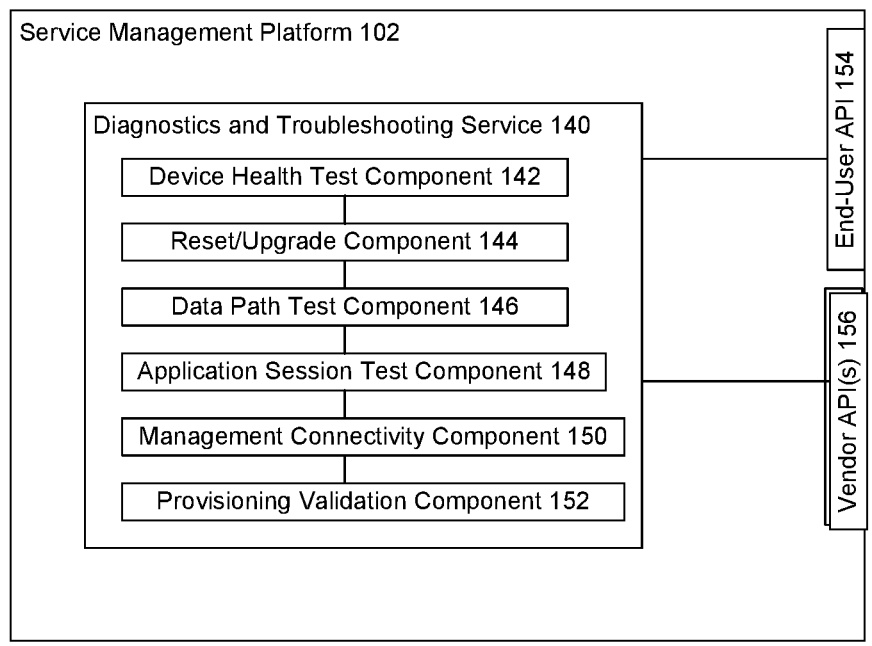

As shown in FIG. 1C, service management platform 102 can include a set of modules to perform a set of functionalities. For example, service management platform 102 can include a diagnostics and troubleshooting service 140, which can include a device health test component 142, a reset/upgrade component 144, a data path test component 146, an application session test component 148, a management connectivity component 150, a provisioning validation component 152, and/or the like. In some implementations, service management platform 102 can include an end-user API 154 and one or more vendor APIs 156.

Diagnostics and troubleshooting service 140 includes one or more computing resources to perform diagnostics to identify issues and troubleshooting to resolve the issues for a set of resources and/or services. For example, diagnostics and troubleshooting service 140 can include a set of components described herein to perform issue identification and resolution for a set of virtualized networking devices (e.g., uCPEs 122 and 126, vCPE 130, etc.), a set of virtualized network services, a set of virtualized network service controllers, and/or the like. In some implementations, diagnostics and troubleshooting service 140 can communicate with different vendor provided devices using different vendor APIs 156. For example, diagnostics and troubleshooting service 140 can use vendor APIs 156 to communicate with dedicated hardware devices, white-box uCPEs, service chains, cloud based virtualized customer premises equipment (vCPE), and/or the like.

In some implementations, diagnostics and troubleshooting service 140 can provide end-user API 154 to enable an end-user (e.g., of client device 104) to control diagnostics and troubleshooting service 140 and one or more vendor-specific resources and/or services without requiring end-user knowledge of the one or more vendor APIs 156. In some implementations, diagnostics and troubleshooting service 140 can provide an abstraction layer using end-user API 154. For example, diagnostics and troubleshooting service 140 can communicate with other client devices used by customers, technicians, operators, and/or the like by enabling access to end-user API 154 to an enterprise portal, a chatbot, a device API, and/or the like. By providing the access to end-user API 154, diagnostics and troubleshooting service 140 abstracts vendor provided resources and/or services to different customers, technicians, operators, devices, and/or the like, thereby obviating a need to learn new API commands, customize device programming, and/or the like each time a new resource or service is deployed.

Device health test component 142 includes one or more computing resources allocated to perform one or more diagnostic tests. For example, device health test component 142 can receive, via end-user API 154, a request to perform a diagnostic test, and can use a vendor API 156 to perform the diagnostic test on a service, such as a vendor application, a virtualized network service, a physical network service, and/or the like. In some implementations, device health test component 142 can perform a diagnostic test when a new service is ordered for provisioning. For example, based on a customer requesting a new virtualized network service, and service management platform 102 provisioning the new virtualized network service, device health test component 142 can perform one or more diagnostic tests to determine whether the new virtualized network service is operating without issues. Additionally, or alternatively, when an issue is detected for a virtualized network service (e.g., based on receiving a trouble ticket, determining a failure of a diagnostic test, and/or the like), device health test component 142 can perform a set of diagnostic tests to determine a status of the virtualized network service, and determine a resolution for the issue. In some implementations, device health test component 142 can obtain a test suite, a list of autonomous tests, and/or the like, and can execute diagnostic tests of the test suite, the list of autonomous tests, and/or the like. In some implementations, device health test component 142 can obtain results of executing diagnostic tests, can abort execution of diagnostic tests (e.g., upon detecting an issue to reduce a resource utilization relative to continuing execution), can schedule execution of diagnostic tests (e.g., for a time when less than a threshold resource utilization is expected to avoid interruption to virtualized network services), and/or the like.

Reset/upgrade component 144 includes one or more computing resources to perform a reset to a virtualized network service and/or a virtualized network device. In some implementations, reset/upgrade component 144 can alter an allocation of resources for and/or provide end-to-end monitoring of a virtualized network service and/or a virtualized network device to upgrade the virtualized network service and/or virtualized network device.

Data path test component 146 includes one or more computing resources to implement a diagnostic test. For example, data path test component 146 can apply a diagnostic test to a data path in a virtualized network function. For example, data path test component 146 can determine whether end-point client devices 120 and 124 have interne connectivity via a data path of SD-WAN deployment 106. In this case, data path test component 146 can enable monitoring of end-point client devices 120 and 124 for service management platform 102, thereby enabling a more granular detection of issues in SD-WAN deployment 106 than other techniques that perform monitoring on an orchestration cloud network.

Application session test component 148 includes one or more computing resources to test an application session. For example, application session test component 148 can determine whether a session of a virtualized network service and/or an application communicating therewith is operating with an issue.

Management connectivity component 150 includes one or more computing resources to perform one or more diagnostic tests relating to connectivity for management of an SD-WAN deployment. In some implementations, management connectivity component 150 may store and execute one or more diagnostics test specifications (e.g., which may be JSON data models stored in a data structure) that specify a set of tests to be executed and a process for executing the set of tests. In some implementations, management connectivity component 150 may be a micro-service, such as a diagnostics and troubleshooting micro-service, a device abstraction micro-service, a device/service specific micro-service, and/or the like.

Provisioning validation component 152 includes one or more computing resources allocated to validate provisioning of one or more network services. For example, when a customer is to order a new virtualized network service associated with first resources (e.g., hardware or software resources), provisioning validation component 152 can use second resources to monitor the first resources and provide status information identifying whether the first resources are correctly allocated, whether there are any issues with the first resources (e.g., based on one or more diagnostic tests being performed, and/or the like). In some implementations, provisioning validation component 152 can identify a new virtualized network service for deployment in SD-WAN deployment 106, and can add the new virtualized network service to a group of monitored virtualized network services that are to be monitored using service management platform 102. In this way, provisioning validation component 152 ensures that the new network service is evaluated using diagnostic tests that are executed by service management platform 102.

Figure 1D:
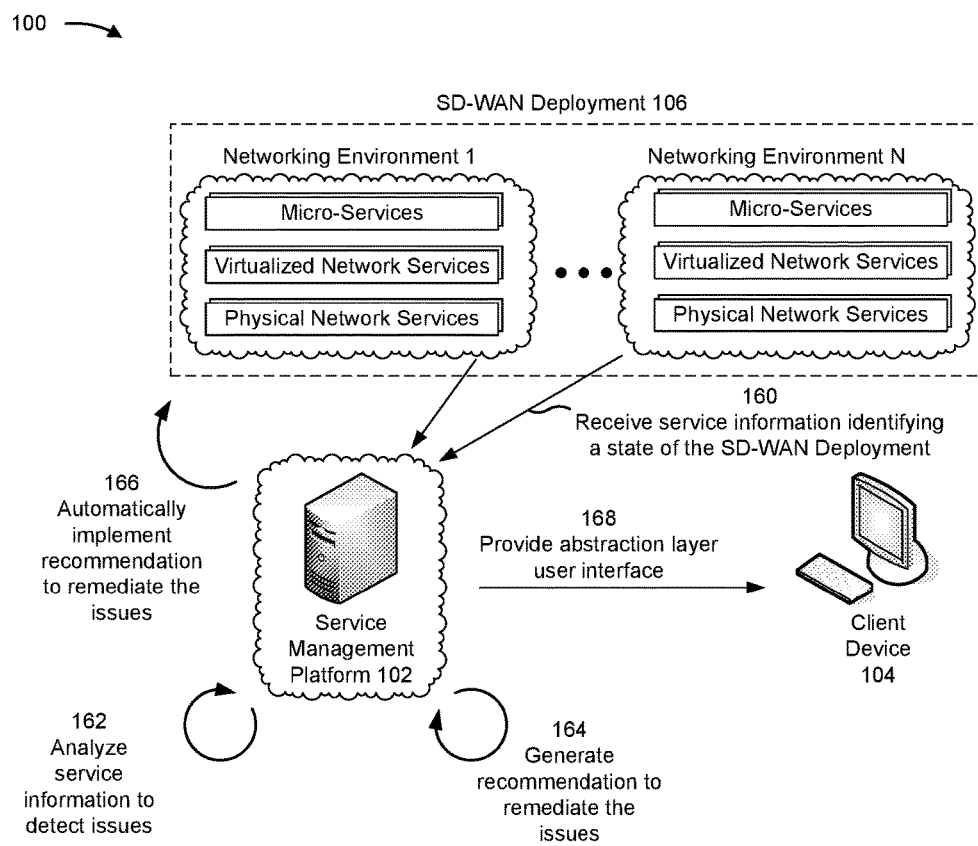

As shown in FIG. 1D, and by reference number 160, service management platform 102 can receive service information identifying a state of SD-WAN deployment 106. For example, service management platform 102 can receive service information identifying a state of one or more vendor applications (e.g., which may be implemented as micro-services), one or more virtualized network services, one or more physical network services, and/or the like of one or more networking environments. In this way, service management platform 102 can enable centralized control and/or configuration of networking environments of SD-WAN deployment 106.

In some implementations, service management platform 102 can receive information associated with detecting an issue associated with SD-WAN deployment 106. For example, service management platform 102 can automatically obtain information associated with detecting an issue (e.g., based on periodic queries, based on event triggers, and/or the like). Additionally, or alternatively, service management platform 102 can receive user input associated with requesting status information for a network service, such as a virtualized network service. In this case, service management platform 102 can obtain event data identifying one or more events associated with the virtualized network service.

Additionally, or alternatively, service management platform 102 can identify fault data identifying one or more faults associated with the virtualized network service, such as an exception thrown by the virtualized network service, an error associated with the virtualized network service, and/or the like. Additionally, or alternatively, service management platform 102 can identify service level agreement (SLA) information, associated with identifying a failure to satisfy an SLA requirement. For example, service management platform 102 can store SLA information for a virtualized network service and can obtain data to confirm whether the SLA is satisfied, such as network connectivity data, domain name server data, dynamic host configuration protocol data, reliability data, responsiveness data, reporting data, and/or the like. Additionally, or alternatively, service management platform 102 can identify repair data, failure data, and/or diagnostic data associated with one or more previous attempts to repair an issue with a virtualized network service.

In some implementations, service management platform 102 can automatically obtain data regarding a virtualized network service based on a proactive monitoring procedure. For example, service management platform 102 can automatically obtain the data periodically during operation of the virtualized network service. Additionally, or alternatively, service management platform 102 can obtain the data based on a coactive monitoring procedure. For example, service management platform 102 can automatically obtain the data during provisioning of the virtualized network service, activation of the virtualized network service, workflow service verification of the virtualized network service, and/or the like. Additionally, or alternatively, service management platform 102 can obtain the data based on a reactive monitoring procedure. For example, service management platform 102 can automatically obtain the data based on detecting a fault, an alarm, a particular type of event, an edit to a system log, an SLA violation, and/or the like.

In some implementations, service management platform 102 can generate an analytics model of SD-WAN operation based on the data. For example, service management platform 102 can perform a pre-processing operation, a model training operation, a model verification operation, and/or the like on the data to generate the analytics model of SD-WAN operation, as described herein. In some implementations, service management platform 102 can perform the pre-processing operation to pre-process the data to generate the analytics model. For example, service management platform 102 can pre-process the data to structure the data for further processing. In some implementations, service management platform 102 can convert textual data into numeric data, convert unstructured data into structured column data, remove anomalous data (e.g., data that differs from an average value by a threshold amount), remove incomplete data, and/or the like. In this way, service management platform 102 can organize the data for processing using machine learning techniques to generate an analytics model.

In some implementations, service management platform 102 can process the data, after pre-processing the data and using a machine learning technique, to generate the analytics model of SD-WAN operation. For example, service management platform 102 can determine a set of predictors for issues in SD-WAN operation, predictors for normal SD-WAN operation, and/or the like. A predictor can refer to a value for an instance of a virtualized network service, vendor application, or physical network service, such as a packet drop rate, a bit error rate, a latency, a throughput, a rate of trouble ticket inflow, and/or the like. For example, service management platform 102 can use a deep learning technique to process the data to determine that a subset of variables are predictors of, for example, an issue in SD-WAN operation. In this case, service management platform 102 can perform, for example, a dimensionality reduction procedure to reduce a quantity of variables in the model of SD-WAN operation, thereby enabling subsequent prediction with reduced processing utilization relative to including variables that are not predictors or do not satisfy a threshold level of predictiveness.

In some implementations, service management platform 102 can obtain information associated with diagnosing the issue associated with SD-WAN deployment 106. For example, service management platform 102 can perform connectivity checks using one or more virtualized network devices, such as uCPE 122 or 124, vCPE 130, and/or the like. Additionally, or alternatively, service management platform 102 can perform a device health check. For example, service management platform 102 can access one or more physical or virtualized devices to determine a processor state, a memory state, an interface state, and/or the like. Additionally, or alternatively, service management platform 102 can perform a data path test. For example, service management platform 102 can determine whether an endpoint client device has Internet connectivity.

As further shown in FIG. 1D, and by reference number 162, service management platform 102 can analyze service information to detect issues. For example, using the analytics model of SD-WAN operation, and service information regarding a state of SD-WAN deployment 106, service management platform 102 can detect an issue. In some implementations, service management platform 102 can apply a set of diagnostic tests to obtain the service information and/or to detect issues associated with SD-WAN deployment 106. For example, service management platform 102 can execute a set of diagnostic tests in accordance with a test-suite workflow specification, which can define a sequence of tests, a set of conditional flows for selection of tests (e.g., service management platform 102 can use one or more configured instructions, which include one or more conditional instructions, to dynamically select diagnostic tests to execute based on results of previous executed diagnostic tests), a set of service tags for identifying virtualized network services to test, a set of vendor tags for identifying vendor APIs with which to communicate to execute tests, and/or the like. In this case, service management platform 102 can receive information as a result of executing the set of diagnostic tests, and can perform end-to-end fault analysis using machine learning techniques to identify an issue, to determine a cause of an issue, and/or the like. In some implementations, service management platform 102 can execute one or more diagnostic tests based on a type of virtualized network service being provided in SD-WAN deployment 106. For example, service management platform 102 can execute a first type of diagnostic test for a first type of virtualized network service and a second type diagnostic test for a second type of virtualized network service.

In some implementations, service management platform 102 can analyze the service information to identify a parameter that deviates from an expected parameter value. For example, service management platform 102 can determine, based on the analytics model of SD-WAN operation that a particular parameter (e.g., a memory utilization parameter, a bandwidth parameter, a jitter parameter, a traceroute parameter, etc.) is associated with a particular range of values during normal operation. In this case, service management platform 102 can, based on analyzing the service information, determine that the particular parameter deviates from the particular range of values to detect an issue. In some implementations, service management platform 102 can apply weights to tens, hundreds, thousands, or millions of parameters relating to SD-WAN deployment 106 based on the analytics model of SD-WAN operation, and can detect an issue with SD-WAN deployment 106 based on analyzing the parameters after applying the weights.

As further shown in FIG. 1D, and by reference number 164, based on the analytics model of SD-WAN operation, service management platform 102 can generate a recommendation. For example, service management platform 102 can generate a recommendation to perform self-healing, such as a recommendation relating to adjusting a connection (e.g., by physically adjusting a cable or electronically adjusting one or more connection parameters), generating a trouble ticket to trigger a repair, and/or the like. In this case, based on the analytics model of SD-WAN operation, service management platform 102 can identify that a particular event is associated with a threshold likelihood of relating to a particular issue, and can identify that a particular resolution to the issue is associated with a threshold efficacy. In some implementations, service management platform 102 can analyze a set of stored recommendations relating to previous issues to match a previous issue to a current issue. In this case, service management platform 102 can generate a recommendation to apply a resolution that was previously applied to the previous issue that matches the current issue. In some implementations, service management platform 102 can use machine learning to generate the recommendation. For example, service management platform 102 can use data associated with previous parameter adjustments applied to SD-WAN deployments to determine a parameter adjustment that can be used to resolve a current issue with SD-WAN deployment 106. In some implementations, service management platform 102 can use supervised machine learning. For example, service management platform 102 can recommend generating trouble tickets to resolve a first set of issues, can monitor actions performed by technicians based on the trouble tickets, and can generate subsequent recommendations to automatically resolve a second set of issues based on the actions performed by the technicians to resolve the first set of issues. In this way, by using supervised machine learning, service management platform 102 can reduce a utilization of processor resources to generate a model for recommending resolutions to issues relative to unsupervised machine learning.

As further shown in FIG. 1D, and by reference number 166, service management platform 102 can automatically implement the particular resolution based on generating the recommendation. Additionally, or alternatively, service management platform 102 can provide an alert to recommend the particular resolution. In this way, based on automatically monitoring a network with virtualized network services, service management platform 102 can resolve problems and/or identify problems for resolution faster than is possible for a human, thereby reducing an interruption to network services.

In some implementations, based on a result obtaining information associated with diagnosing an issue, service management platform 102 can perform a repair procedure for SD-WAN deployment 106. For example, service management platform 102 can automatically reset or restart a virtualized network function (VNF), a customer premises equipment (CPE), and/or the like. Additionally, or alternatively, service management platform 102 can repair or modify a configuration of a virtualized or physical network device, repair or modify a firmware of the virtualized or physical network device, and/or the like.

As further shown in FIG. 1D, and by reference number 168, service management platform 102 can provide an abstraction layer user interface to client device 104 for display. For example, based on the state of SD-WAN deployment 106, service management platform 102 can generate a user interface, as described in more detail with regard to FIG. 1E, that is vendor agnostic to enable a user to control aspects of a networking environment including one or more services. In this way, service management platform 102 can enable control of SD-WAN deployment 106, can provide information identifying a recommendation for resolving an issue of SD-WAN deployment 106, can provide information identifying a resolution automatically implemented for SD-WAN deployment 106, and/or the like.

As shown in FIG. 1E, abstraction layer user interface 170 can provide a particular view of information regarding SD-WAN deployment 106. As shown by reference number 172, abstraction layer user interface 170 can include information identifying a current network deployment. For example, abstraction layer user interface 170 can provide information identifying networks of SD-WAN deployment 106, information identifying one or more services and/or policies that are active or inactive for SD-WAN deployment 106, and/or the like. As shown by reference number 174, abstraction layer user interface 170 can include information identifying a set of test results. For example, abstraction layer user interface 170 can indicate that a hardware diagnostics test is passed, a network connectivity diagnostics test is failed, and a virtualized network services test is passed.

As further shown in FIG. 1E, and by reference number 176, abstraction layer user interface 170 can provide a chat-based management console to enable an operator to use service management platform 102. For example, abstraction layer user interface 170 can provide a natural language chat interface for controlling SD-WAN deployment 106. In this case, service management platform 102 can use a natural language processing functionality to process instructions from and provide feedback to a user of a client device. In some implementations, service management platform 102 can detect an issue, and can provide information regarding the issue via the chat interface. As shown, service management platform 102 can use the natural language processing functionality to indicate that service management platform 102 has detected two issues, and to identify a first issue as relating to connectivity of uCPE 126, and a second issue as relating to slow connectivity for end-point client devices 120 of the headquarters network.

In some implementations, service management platform 102 can identify an issue based on processing data relating to the SD-WAN deployment, and can perform a set of diagnostic tests to evaluate the issue. In some implementations, service management platform 102 can perform the set of diagnostics tests hierarchically. For example, service management platform 102 can perform first tests on hardware of the SD-WAN deployment (e.g., a hardware diagnostics evaluation), second tests on network connectivity of the SD-WAN deployment (e.g., a network connectivity diagnostics evaluation), third tests on virtualized network services of the SD-WAN deployment (e.g., a virtualized network services diagnostics evaluation), and/or the like. In this way, service management platform 102 prioritizes potential issues based on a predicted severity with regard to a quantity of users affected, a utilization of computing resources wasted, and/or the like. In some implementations, service management platform 102 can perform end-to-end testing of the SD-WAN deployment using access to virtualized network services, virtualized networking devices, and/or the like of the SD-WAN deployment. For example, service management platform 102 can perform one or more tests regarding device cloud manageability, device controller health, device WAN transport (e.g., by performing primary path connectivity testing, secondary path connectivity testing, bandwidth status, speed testing, traceroute testing, real-time packet monitoring, etc.), and/or the like. Additionally, or alternatively, service management platform 102 can perform one or more tests regarding a virtualized private network status (e.g., status of a site-to-site virtualized private network, a multiprotocol label switching network virtualized private network, etc.), a device local area network connectivity (e.g., an interface connectivity test, a dynamic host configuration protocol status test), and/or the like. Additionally, or alternatively, service management platform 102 can perform one or more tests regarding a device health status (e.g., a processing utilization, memory utilization, network interface status, etc.), an end-user application session service level agreement status (e.g., a bandwidth test, a latency test, a jitter test, etc.), and/or the like.

In some implementations, based on performing diagnostics, service management platform 102 can detect an event, and analyze the event to determine that an issue is occurring with the virtualized network service. For example, based on the analytics model of SD-WAN operation, described above, service management platform 102 can determine that a deviation from a service level agreement indicates an issue with a virtualized network service. In this case, service management platform 102 can determine a recommendation relating to remediating the issue. For example, service management platform 102 can use the natural language processing functionality to indicate that recommendations for resolving the issue include restarting uCPE 126 and increasing a bandwidth allocation for the gateway device 128 enabling communication between uCPE 122 and the orchestration cloud network.

In some implementations, using the analytics model of SD-WAN operation and based on results of a set of diagnostic tests, service management platform 102 can determine that an adjustment to a device parameter is recommended to remediate the issue. Additionally, or alternatively, service management platform 102 can recommend resetting or restarting a virtualized customer premises equipment and/or a virtualized network function associated therewith. Additionally, or alternatively, service management platform 102 can recommend initiating a trouble ticket to assign an engineer to manually resolve the issue. In this case, service management platform 102 can automatically create the trouble ticket and provide results of the set of diagnostic tests to reduce an amount of time and/or manual effort to manually resolve the issue.

As indicated above, FIGS. 1A-1E are provided merely as examples. Other examples can differ from what was described with regard to FIGS. 1A-1E.

Figure 2:
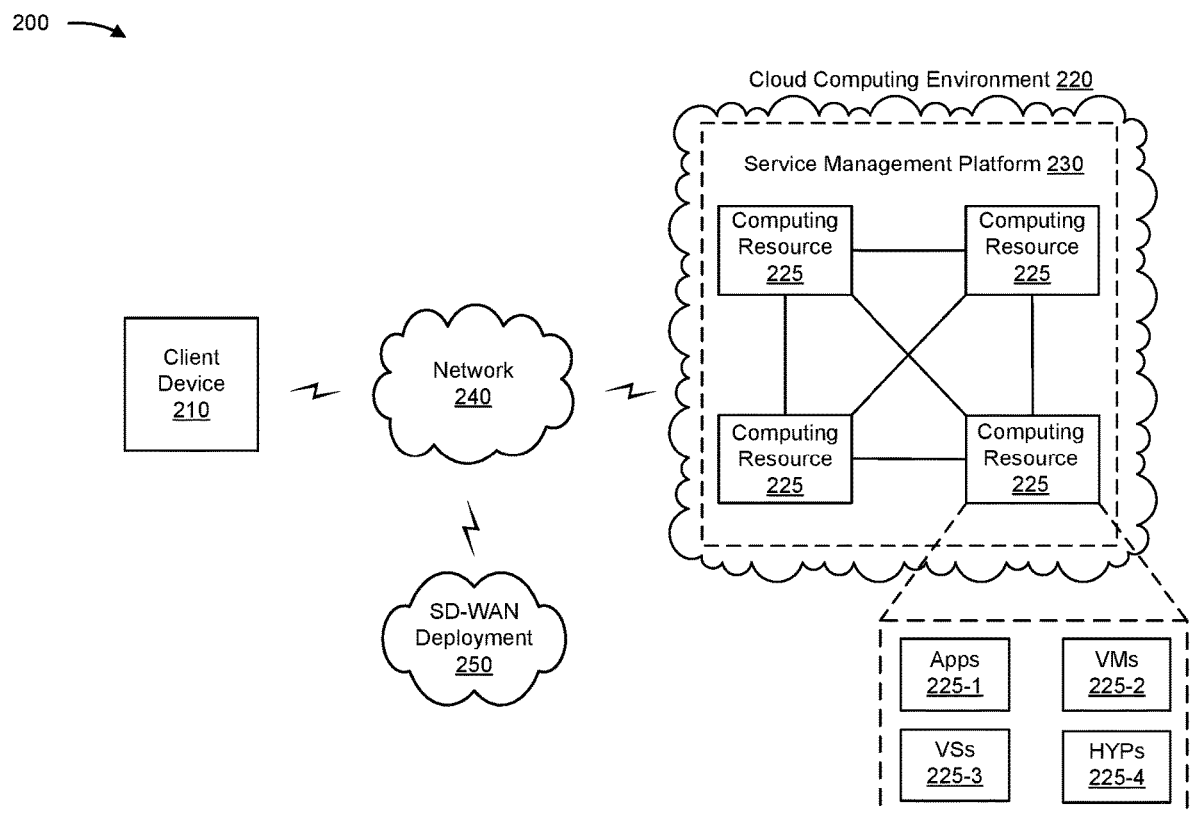
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a client device 210, a cloud computing environment 220, a computing resource 225, a service management platform 230, a network 240, and an SD-WAN deployment 250. Devices of environment 200 can interconnect via wired connections, wireless connections, or a combination of wired and wireless connections.

Client device 210 includes one or more devices capable of receiving, generating, storing, processing, and/or providing information associated with monitoring operation of SD-WAN deployment 250. For example, client device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Service management platform 230 includes one or more computing resources assigned to perform end-to-end monitoring of SD-WAN deployment 250. For example, service management platform 230 can be a platform implemented by cloud computing environment 220 that can detect issues, troubleshoot the issues, resolve the issues, monitor provisioning of virtualized network services, and/or the like. Additionally, or alternatively, service management platform 230 can provide an application programming interface to enable client device 210 to access functions of service management platform 230, and can translate commands from client device 210 via the application programming interface to one or more other commands for one or more vendor-specific application programming interfaces. In this way, service management platform 230 can abstract vendor provided environments for management network services, network functions, cloud environments, network transport services, and/or the like, thereby avoiding a necessity for new software any time a new vendor is selected to provide a portion of SD-WAN deployment 250. In some implementations, service management platform 230 is implemented by computing resources 225 of cloud computing environment 220.

Service management platform 230 can include a server device or a group of server devices. In some implementations, service management platform 230 can be hosted in cloud computing environment 220. Notably, while implementations described herein describe service management platform 230 as being hosted in cloud computing environment 220, in some implementations, service management platform 230 can be non-cloud-based or can be partially cloud-based.

Cloud computing environment 220 includes an environment that delivers computing as a service, whereby shared resources, services, etc. can be provided to manage SD-WAN deployment 250. Cloud computing environment 220 can provide computation, software, data access, storage, and/or other services that do not require end-user knowledge of a physical location and configuration of a system and/or a device that delivers the services. As shown, cloud computing environment 220 can include service management platform 230 and computing resource 225.

Computing resource 225 includes one or more personal computers, workstation computers, server devices, or another type of computation and/or communication device. In some implementations, computing resource 225 can host service management platform 230. The cloud resources can include compute instances executing in computing resource 225, storage devices provided in computing resource 225, data transfer devices provided by computing resource 225, etc. In some implementations, computing resource 225 can communicate with other computing resources 225 via wired connections, wireless connections, or a combination of wired and wireless connections.

As further shown in FIG. 2, computing resource 225 can include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that can be provided to or accessed by client device 210. Application 225-1 can eliminate a need to install and execute the software applications on client device 210. For example, application 225-1 can include software associated with service management platform 230 and/or any other software capable of being provided via cloud computing environment 220. In some implementations, one application 225-1 can send/receive information to/from one or more other applications 225-1, via virtual machine 225-2.

Virtual machine 225-2 includes a software implementation of a machine (e.g., a computer) that executes programs like a physical machine. Virtual machine 225-2 can be either a system virtual machine or a process virtual machine, depending upon use and degree of correspondence to any real machine by virtual machine 225-2. A system virtual machine can provide a complete system platform that supports execution of a complete operating system ("OS"). A process virtual machine can execute a single program, and can support a single process. In some implementations, virtual machine 225-2 can execute on behalf of a user (e.g., client device 210), and can manage infrastructure of cloud computing environment 220, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 can present a virtual operating platform to the guest operating systems, and can manage the execution of the guest operating systems. Multiple instances of a variety of operating systems can share virtualized hardware resources.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

SD-WAN deployment 250 includes one or more wired and/or wireless networks. For example, network 240 can include computing resources allocated to provide virtualized network services in an SD-WAN computing environment. In some implementations, SD-WAN deployment 250 can include multiple different vendor provided hardware devices, multiple different vendor provided software services, and/or the like. In some implementations, SD-WAN deployment can be implemented using computing resources 225 of cloud computing environment 220 and/or another cloud computing environment.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
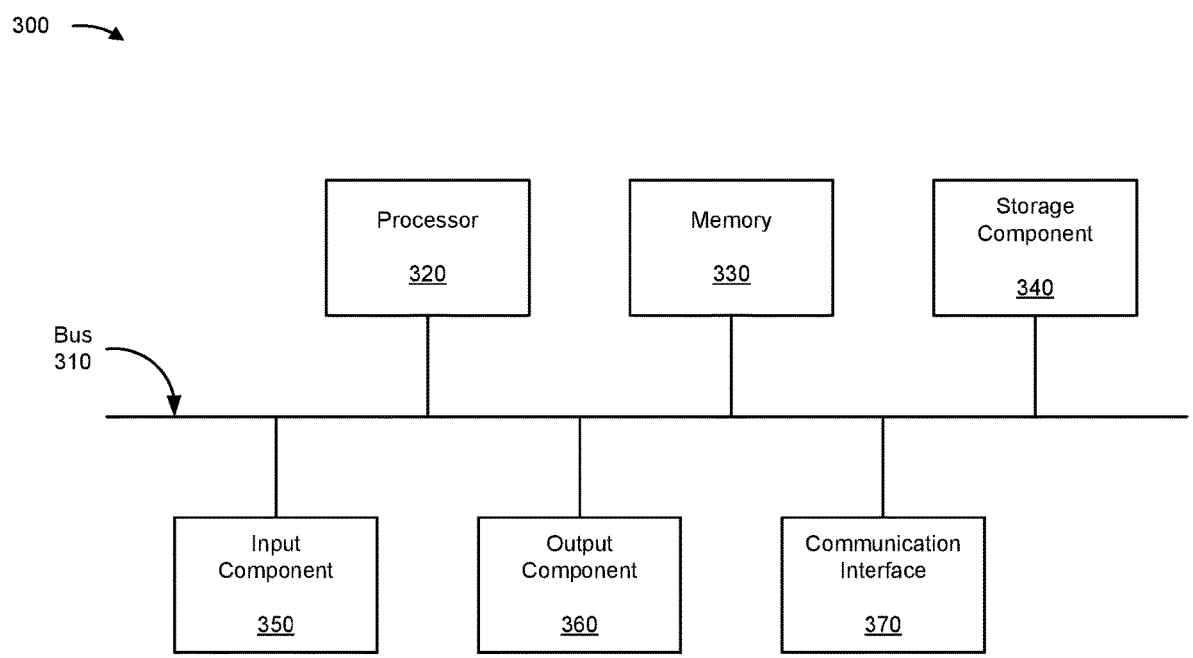
FIG. 3 is a diagram of example components of one or more devices of FIG. 2.

FIG. 3 is a diagram of example components of a device 300. Device 300 can correspond client device 210, computing resource 225, and/or service management platform 230. In some implementations, client device 210, computing resource 225, and/or service management platform 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
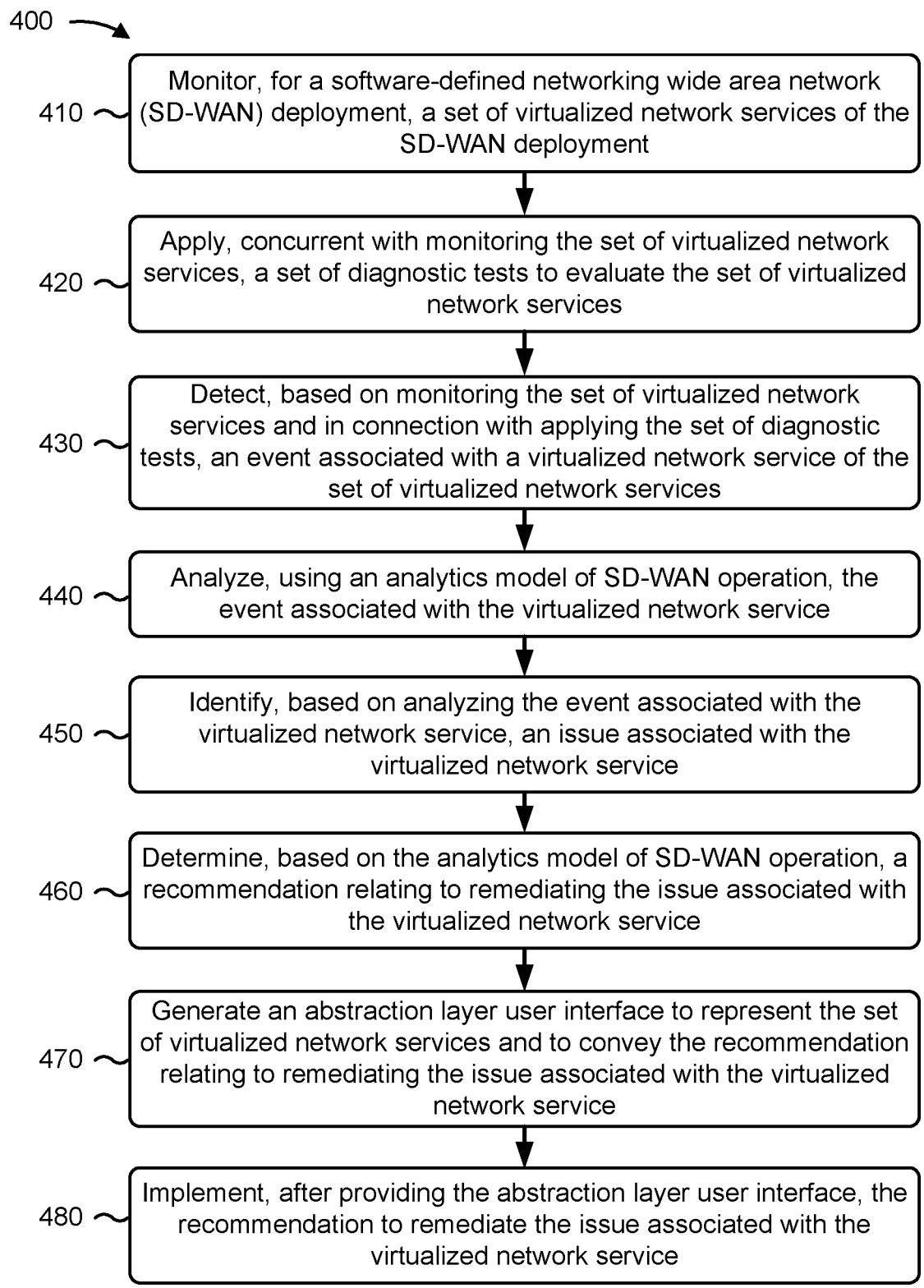
FIG. 4 is a flow chart of an example process for virtualized network service management and diagnostics.

FIG. 4 is a flow chart of an example process 400 for virtualized network service management and diagnostics. In some implementations, one or more process blocks of FIG. 4 can be performed by a service management platform (e.g., service management platform 230). In some implementations, one or more process blocks of FIG. 4 can be performed by another device or a group of devices separate from or including a service management platform (e.g., service management platform 230), such as a client device (e.g., client device 210) and a computing resource (e.g., computing resource 225).

As shown in FIG. 4, process 400 can include monitoring, for a software-defined networking wide area network (SD-WAN) deployment, a set of virtualized network services of the SD-WAN deployment (block 410). For example, the service management platform (e.g., using computing resource 225, processor 320, input component 350, output component 360, communication interface 370, and/or the like) can monitor, for a software-defined networking wide area network (SD-WAN) deployment, a set of virtualized network services of the SD-WAN deployment, as described above.

As further shown in FIG. 4, process 400 can include applying, concurrent with monitoring the set of virtualized network services, a set of diagnostic tests to evaluate the set of virtualized network services (block 420). For example, the service management platform (e.g., using computing resource 225, processor 320, output component 360, communication interface 370, and/or the like) can apply, concurrent with monitoring the set of virtualized network services, a set of diagnostic tests to evaluate the set of virtualized network services, as described above.

As further shown in FIG. 4, process 400 can include detecting, based on monitoring the set of virtualized network services and in connection with applying the set of diagnostic tests, an event associated with a virtualized network service of the set of virtualized network services (block 430). For example, the service management platform (e.g., using computing resource 225, processor 320, input component 350, communication interface 370, and/or the like) can detect, based on monitoring the set of virtualized network services and in connection with applying the set of diagnostic tests, an event associated with a virtualized network service of the set of virtualized network services, as described above.

As further shown in FIG. 4, process 400 can include analyzing, using an analytics model of SD-WAN operation, the event associated with the virtualized network service (block 440). For example, the service management platform (e.g., using computing resource 225, processor 320, memory 330, storage component 340, and/or the like) can analyze, using an analytics model of SD-WAN operation, the event associated with the virtualized network service, as described above.

As further shown in FIG. 4, process 400 can include identifying, based on analyzing the event associated with the virtualized network service, an issue associated with the virtualized network service (block 450). For example, the service management platform (e.g., using computing resource 225, processor 320, memory 330, storage component 340, and/or the like) can identify, based on analyzing the event associated with the virtualized network service, an issue associated with the virtualized network service, as described above.

As further shown in FIG. 4, process 400 can include determining, based on the analytics model of SD-WAN operation, a recommendation relating to remediating the issue associated with the virtualized network service (block 460). For example, the service management platform (e.g., using computing resource 225, processor 320, memory 330, storage component 340, and/or the like) can determine, based on the analytics model of SD-WAN operation, a recommendation relating to remediating the issue associated with the virtualized network service, as described above.

As further shown in FIG. 4, process 400 can include generating an abstraction layer user interface to represent the set of virtualized network services and to convey the recommendation relating to remediating the issue associated with the virtualized network service (block 470). For example, the service management platform (e.g., using computing resource 225, processor 320, memory 330, storage component 340, and/or the like) can generate an abstraction layer user interface to represent the set of virtualized network services and to convey the recommendation relating to remediating the issue associated with the virtualized network service, as described above.

As further shown in FIG. 4, process 400 can include implementing, after providing the abstraction layer user interface, the recommendation to remediate the issue associated with the virtualized network service (block 480). For example, the service management platform (e.g., using computing resource 225, processor 320, output component 360, communication interface 370, and/or the like) can implement, after providing the abstraction layer user interface, the recommendation to remediate the issue associated with the virtualized network service, as described above.

Process 400 can include additional implementations, such as any single implementation or any combination of implementations described below and/or in connection with one or more other processes described elsewhere herein.

In some implementations, when applying the set of diagnostic tests, the service management platform can apply the set of diagnostic tests according to a set of configured instructions, where the set of configured instructions include one or more conditional instructions relating to virtualized network services of the set of virtualized network services.

In some implementations, the service management platform can configure the set of diagnostic tests based on types of virtualized network services deployed in the set of virtualized network services. In some implementations, the service management platform can dynamically generate code to apply the set of diagnostic tests, and, when applying the set of diagnostic tests, can execute the code to apply the set of diagnostic tests.

In some implementations, the service management platform can generate the analytics model of SD-WAN operation based on results of a plurality of diagnostic tests, and, when applying the set of diagnostic tests, can update the analytics model of SD-WAN operation based on results of the set of diagnostic tests.

In some implementations, when identifying the issue, the service management platform can evaluate a hierarchy of the SD-WAN deployment to identify the issue, and the hierarchy for evaluation can include at least one of a hardware diagnostics evaluation, a network connectivity diagnostics evaluation, or a virtualized network services diagnostics evaluation.

In some implementations, the service management platform can identify a new network service for deployment in the SD-WAN deployment, and can add the new network service into a group of monitored network services evaluated using the set of diagnostic tests, where the group of monitored network services includes a set of physical network services and the set of virtualized network services.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive service information that identifies a state of a plurality of network environments of a software-defined networking wide area network (SD-WAN) deployment based on applying a plurality of diagnostic tests hierarchically according to a prioritization of potential issues relating to the plurality of network environments, wherein:
the plurality of diagnostic tests includes at least one of: a hardware diagnostics evaluation, a network connectivity diagnostics evaluation, or a virtualized network services diagnostics evaluation; and
the prioritization of potential issues relates to at least one of a quantity of affected users or a utilization of computing resources;
generate an analytics model associated with the SD-WAN deployment based on results associated with applying the plurality of diagnostic tests;
detect, based on the service information and the analytics model associated with the SD-WAN deployment, an issue, associated with a particular network environment of the plurality of network environments, via a particular application program interface (API) associated with the particular network environment;
determine, based on the analytics model, a recommendation for resolving the issue; and
provide the recommendation to a client device associated with the particular network environment.

2. The device of claim 1, wherein the plurality of diagnostic tests are applied based on a test-suite workflow specification.

3. The device of claim 2, wherein the test-suite workflow specification defines at least one of:

a set of service tags for identifying a set of virtualized network services or a set of vendor tags for identifying a set of vendor APIs.

4. The device of claim 1, wherein the one or more processors are further configured to:
select the plurality of diagnostic tests according to a set of configured instructions,
wherein the set of configured instructions includes one or more conditional instructions relating to one or more virtualized network services of the plurality of network environments.

5. The device of claim 1, wherein the plurality of diagnostic tests are applied based on a type of one or more virtualized network services of the plurality of network environments.

6. A method, comprising:
applying, by a device, a plurality of diagnostic tests to a plurality of network environments of a software-defined networking wide area network (SD-WAN), wherein the plurality of diagnostic tests are applied hierarchically according to a prioritization of potential issues relating to the plurality of network environments, wherein:
the plurality of diagnostic tests includes at least one of: a hardware diagnostics evaluation, a network connectivity diagnostics evaluation, or a virtualized network services diagnostics evaluation; and
the prioritization of potential issues relates to at least one of a quantity of affected users or a utilization of computing resources;
generate an analytics model associated with the SD-WAN deployment based on results associated with applying the plurality of diagnostic tests;
receiving, by the device and based on the plurality of diagnostic tests, service information relating to a plurality of virtualized network services of the plurality of network environments;
determining, by the device and based on the service information and the analytics model associated with the SD-WAN deployment, a parameter, deviating from a particular range of values that corresponds to the parameter and is associated with a normal operation of a particular network environment of the plurality of network environments, via an application program interface (API) associated with the particular network environment,
wherein the parameter relates to an issue associated with the particular network environment,
determining, by the device and based on the analytics model, a recommendation for resolving the issue; and
implementing, by the device, the recommendation for resolving the issue.

7. The method of claim 6, further comprising:
obtaining, based on a proactive monitoring procedure, data relating to one or more virtualized network services of the plurality of virtualized network services; and
generating, based on the data relating to the one or more virtualized network services, the analytics model.

8. The method of claim 7, further comprising:
preprocessing data relating to one or more virtualized network services, of the plurality of virtualized network services, to provide a data structure for the data relating to the one or more virtualized network services,
wherein the generating the analytics model comprises:
generating, based on a machine learning technique and the data structure, the analytics model.

9. The method of claim 8, further comprising:
detecting, based on service information and the analytics model, an event that causes the issue and is associated with the one or more virtualized network services.

10. The method of claim 6, further comprising:
determining, based on the analytics model, a set of predictors associated with one or more issues, or with a normal operation, of the SD-WAN deployment,
wherein the set of predictors correspond to a value associated with an instance of a particular virtualized network service of the plurality of virtualized network services; and
determining, by the device and based on the set of predictors, that the parameter relates to the issue.

11. The method of claim 10, wherein the determining the set of predictors comprises:
determining, using a deep learning network technique, that a subset of variables, of a plurality of variables associated with a model of an SD-WAN operation, is the set of predictors.

12. The method of claim 6, wherein further comprising:
selecting the plurality of diagnostic tests according to a set of configured instructions,
wherein the set of configured instructions includes one or more conditional instructions relating to one or more virtualized network services of the plurality of network environments.

13. The method of claim 6, wherein the plurality of diagnostic tests are applied based on a type of one or more virtualized network services of the plurality of network environments.

14. The method of claim 6, wherein plurality of diagnostic tests are applied based on a test-suite workflow specification.

15. A non-transitory computer-readable medium storing one or more instructions, the one or more instructions comprising:
one or more instructions that, when executed by one or more processors of a gateway device, cause the one or more processors to:
receive service information that identifies a state of a plurality of network environments of a software-defined networking wide area network (SD-WAN) deployment based on applying a plurality of diagnostic tests hierarchically according to a prioritization of potential issues relating to the plurality of network environments, wherein:
the SD-WAN deployment includes a plurality of virtualized network services associated with the plurality of network environments;
the plurality of diagnostic tests includes at least one of: a hardware diagnostics evaluation, a network connectivity diagnostics evaluation, or a virtualized network services diagnostics evaluation; and
the prioritization of potential issues relates to at least one of a quantity of affected users or a utilization of computing resources;
generate an analytics model associated with the SD-WAN deployment based on results associated with applying the plurality of diagnostic tests;
detect, based on the service information and the analytics model associated with the SD-WAN deployment, an issue associated with a particular network environment of the plurality of network environments, via an application program interface (API) associated with the particular network environment;

generate, based on the analytics model, a recommendation associated with a resolution of the issue; and provide the recommendation to a client device associated with the particular network environment.

16. The non-transitory computer-readable medium of claim 15, wherein the one or more instructions, that cause the one or more processors to identify the issue, cause the one or more processors to:

generate an abstraction layer user interface for providing the recommendation to the client device.

17. The non-transitory computer-readable medium of claim 16, wherein the abstraction layer user interface represents the plurality of virtualized network services.

18. The non-transitory computer-readable medium of claim 15, wherein the one or more instructions, when executed by the one or more processors, further cause the one or more processors to:

add a new network service including in the recommendation, into the SD-WAN deployment based on providing the recommendation.

19. The non-transitory computer-readable medium of claim 15, wherein the one or more instructions, when executed by the one or more processors, further cause the one or more processors to:

automatically implement the recommendation.

20. The non-transitory computer-readable medium of claim 15, wherein the one or more instructions, when executed by the one or more processors, further cause the one or more processors to:

select the plurality of diagnostic tests according to a set of configured instructions,
wherein the set of configured instructions includes one or more conditional instructions relating to one or more virtualized network services of the plurality of network environments.

* * * * *